(12) United States Patent
Morris

(10) Patent No.: US 10,722,829 B2
(45) Date of Patent: Jul. 28, 2020

(54) NONWOVEN SLIVER-BASED FILTER MEDIUM FOR FILTERING PARTICULATE MATTER

(71) Applicant: Kirk S. Morris, Gurnee, IL (US)

(72) Inventor: Kirk S. Morris, Gurnee, IL (US)

( * ) Notice: Subject to any disclaimer, the term of this patent is extended or adjusted under 35 U.S.C. 154(b) by 151 days.

(21) Appl. No.: 15/941,719

(22) Filed: Mar. 30, 2018

(65) Prior Publication Data

US 2018/0221799 A1    Aug. 9, 2018

Related U.S. Application Data

(63) Continuation of application No. 14/986,411, filed on Dec. 31, 2015, now abandoned.

(60) Provisional application No. 62/106,991, filed on Jan. 23, 2015, provisional application No. 62/173,108, filed on Jun. 9, 2015.

(51) Int. Cl.
*B01D 39/16* (2006.01)
*D04H 1/541* (2012.01)

(52) U.S. Cl.
CPC ...... *B01D 39/1623* (2013.01); *B01D 2239/02* (2013.01); *B01D 2239/064* (2013.01); *B01D 2239/065* (2013.01); *B01D 2239/0618* (2013.01); *B01D 2239/0636* (2013.01); *B01D 2239/0695* (2013.01); *B01D 2239/1233* (2013.01); *B01D 2239/1291* (2013.01); *D04H 1/541* (2013.01)

(58) Field of Classification Search
CPC ........ B01D 39/1623; B01D 2239/0618; B01D 2239/0636; B01D 2239/064; B01D 2239/02; B01D 2239/0695; B01D 2239/1233; B01D 2239/065; D04H 1/541
See application file for complete search history.

(56) References Cited

U.S. PATENT DOCUMENTS

| | | | | |
|---|---|---|---|---|
| 2,197,471 A | * | 4/1940 | Hooper | B01D 27/005 210/437 |
| 2,538,899 A | | 1/1951 | Dodge et al. | |
| 3,017,239 A | | 1/1962 | Rodman | |
| 3,065,505 A | | 11/1962 | Pratt et al. | |
| 3,595,731 A | | 7/1971 | Davies et al. | |
| 4,564,377 A | * | 1/1986 | Kocatas | B01D 39/02 428/112 |

(Continued)

FOREIGN PATENT DOCUMENTS

DE    102011016689 A1    12/2011

OTHER PUBLICATIONS

Celanese Acetate 2001 "Complete Textile Glossary" select definitions (Year: 2001).*

(Continued)

*Primary Examiner* — Liam Royce
(74) *Attorney, Agent, or Firm* — Womble Bond Dickinson (US) LLP

(57) ABSTRACT

A filter medium for filtering matter from a fluid and the manufacture thereof are provided. In one exemplary embodiment, a method may be performed by a filter medium for filtering particulate matter from a fluid. Further, the filter medium may include a nonwoven sliver formed into a predetermined shape and composed of first synthetic staple fibers having a first denier, second synthetic staple fibers having a second denier, and third synthetic staple fibers having a third denier.

20 Claims, 15 Drawing Sheets

(56) References Cited

U.S. PATENT DOCUMENTS

| | | | |
|---|---|---|---|
| 5,240,610 A * | 8/1993 | Tani | B01D 29/11 |
| | | | 210/497.1 |
| 6,169,045 B1 | 1/2001 | Pike et al. | |
| 7,223,347 B2 * | 5/2007 | Boner | B01D 24/005 |
| | | | 210/795 |
| 7,476,632 B2 | 1/2009 | Olson et al. | |
| 2004/0211160 A1 | 10/2004 | Rammig et al. | |
| 2010/0319543 A1 | 12/2010 | Witsch et al. | |
| 2013/0125346 A1 | 5/2013 | Griggs et al. | |
| 2014/0026909 A1 | 1/2014 | Sebastian | |
| 2016/0271540 A1 | 9/2016 | Nielsen | |

OTHER PUBLICATIONS

"Carding" Celanese Acetate. Complete Textile Glossary. New York, NY (Year: 2001).

"Sliver" Celanese Acetate. (2001). Complete Textile Glossary, New York, NY.

Definition of sliver by Merriam-Webster, https://www.merriamwebster/dictionary/sliver.

Textile Institute, The, Textile Terms and Definitions, 6th Edition, 1970, McCorqoudale Printers, Ltd., Newton-le-Willows, selected pages.

"Tow" Celanese Acetate. Complete Textile Glossary. New York, NY (Year: 2001).

* cited by examiner

100

1300

1301

FILTERING, BY A FILTER MEDIUM, PARTICULATE MATTER FROM A FLUID, WHEREIN THE FILTER MEDIUM INCLUDES A NONWOVEN SLIVER FORMED INTO A PREDETERMINED SHAPE AND COMPOSED OF FIRST SYNTHETIC STAPLE FIBERS HAVING A FIRST DENIER,
SECOND SYNTHETIC STAPLE FIBERS HAVING A SECOND DENIER, AND THIRD SYNTHETIC STAPLE FIBERS HAVING A THIRD DENIER

| Filter Media | Flush Volume (ml) | No. of Filter Balls for Analysis | Number of Fibers Migrated with Dimensions of ≥ 100µm x 10µm |
|---|---|---|---|
| One embodiment of a filter medium as disclosed herein 1401 | 18,990 ml | 6 | 71 |
| FIBALON® Pool media 1403 | 18,990 ml | 6 | 1,382 |
| POLYBALLS media 1405 | 18,990 ml | 6 | 1,422 |

FIG. 14

NONWOVEN SLIVER-BASED FILTER MEDIUM FOR FILTERING PARTICULATE MATTER

CROSS REFERENCE TO RELATED APPLICATIONS

This application is a continuation of U.S. patent application Ser. No. 14/986,411, filed Dec. 31, 2015, which claims benefit under 35 U.S.C. § 119(e) to U.S. Prov. App. No. 62/106,991, filed Jan. 23, 2015, and U.S. Prov. App. No. 62/173,108, filed Jun. 9, 2015, which are all hereby incorporated by reference as if fully set forth herein.

FIELD OF INVENTION

The present disclosure relates generally to filter media, and in particular to filter media for filtering matter from a fluid and the manufacturing thereof.

BACKGROUND

Filter media is used in a filter for filtering matter such as particulate matter from fluids and includes media for air filters, chemical filters, coolant filters, hydraulic filters, oil filters, water filters, and the like. Further, filter media is used in many consumer and industrial filtration applications such as for drinking water, swimming pools, aquaculture, wastewater recycling, oil separation, and other applications. In one example, a filter media disposed in a cartridge filter filters water input at the top of the cartridge through a fluid inlet. The filter media then filters the water with the filtered water output through a fluid outlet.

A filter medium is fabricated from a diverse range of materials such as sand, glass, asbestos, natural fibers such as wood pulp and the like, and synthetic polymers such as thermoplastics and the like. Thermoplastics are a plastic material that becomes pliable or moldable above a certain temperature and solidifies during cooling. Thermoplastics may be used to form polymeric and non-polymeric thermoplastic fibers.

A filter medium is typically designed to provide a high filtering efficiency to prevent fine particulate matter from passing through while maintaining a low pressure drop across the medium over its useful life. Further, a filter medium is typically designed for an increased useful life while not requiring frequent cleaning or replacement. However, these design requirements tend to be inversely related, requiring design trade-offs. For instance, a medium having a high filtering efficiency tends to accumulate more particulate matter resulting in a high pressure drop. The loft or thickness of a filter medium typically indicates its ability to entrap particulate matter within the medium's interstitial spaces or pores without impeding the flow of a fluid through the medium. This filtration process is commonly known as depth filtration. In contrast, surface filtration accumulates particulate matter on a surface of a medium, building a high pressure drop across the medium.

There have been many attempts to develop a filter medium having high filter efficiency while maintaining a low pressure drop across the medium. One such attempt uses nonwoven material as a two-dimensional filter. For instance, a fluid having particulate matter flows through one side of the nonwoven material of a filter and a filtered fluid flows out of the other side of the nonwoven material. Further, the filtered particulate matter forms a filter cake on the nonwoven material, resulting in reducing the effectiveness of the filter and requiring a higher pumping power to maintain operation over a longer period. In addition, the use of nonwoven material as a filter material typically suffers from fiber migration, since the fibers do not always stay in their initial positions.

In another such attempt, nonwoven material has been constructed using hollow polyester fibers to form staple fibers. These staple fibers are used to form a single sliver, which may be rolled to form the filtered media. However, the staple fibers cause undesirable fiber migration. Also, the use of hollow fibers have less tensile strength and are prone to breaking, leading to increased fiber migration.

In another such attempt, a porous, compressible filter medium is disposed between compression plates to achieve desired filtration results. The compression plates are used to vary the density and denier (linear mass density) of the fibers of the filter medium. In addition to requiring the use of compression plates, this medium also suffers from a reduced capacity to hold particulate matter in the filter bed. Further, this medium is typically limited to an upflow filter systems.

Accordingly, there is a need for improved techniques relating to a filter medium having high filter efficiency while reducing filter migration and maintaining a low pressure drop across the medium and the manufacturing thereof. In addition, other desirable features and characteristics of the present disclosure will become apparent from the subsequent detailed description and claims, taken in conjunction with the accompanying figures and the foregoing technical field and background.

SUMMARY

The following presents a simplified summary of the disclosure in order to provide a basic understanding to those of skill in the art. This summary is not an extensive overview of the disclosure and is not intended to identify key or critical elements of embodiments of the invention or to delineate the scope of the invention. The sole purpose of this summary is to present some exemplary embodiments disclosed herein in a simplified form as a prelude to the more detailed description that is presented later.

The present disclosure relates to filter media having a single or multiple nonwoven slivers for filtering particulate matter from fluids and the manufacturing thereof. In one exemplary embodiment, a filter medium may be configured to include a nonwoven sliver having a predetermined density and formed into a predetermined shape for filtering particulate matter from a fluid. The nonwoven sliver may be composed of first synthetic staple fibers having a first staple fiber length and a first denier and second synthetic staple fibers having a second staple fiber length and a second denier. Further, a portion of the first synthetic staple fibers may be crimped with a portion of the second synthetic staple fibers.

In another exemplary embodiment, a filter medium may be configured to include a first nonwoven sliver composed of a first set of synthetic staple fibers having different staple fiber lengths and a first density. Further, the filter medium may be configured to include a second nonwoven sliver composed of a second set of synthetic staple fibers having different staple fiber lengths and a second density. The first nonwoven sliver and the second nonwoven sliver may be combined to form a predetermined shape having a core with a density of at least the first density. Also, the first density may be greater than the second density.

In another exemplary embodiment, a method of producing a filter medium for filtering a fluid may include constructing a first nonwoven sliver from a first set of synthetic staple fibers having different staple fiber lengths and a first density. Further, the method may include constructing a second nonwoven sliver from a second set of synthetic staple fibers having different staple fiber lengths and a second density. Also, the method may include combining the first nonwoven sliver and the second nonwoven sliver to obtain a combined material. Finally, the method may include forming the combined material into a predetermined shape to obtain the filter medium, wherein the filter medium has a core with substantially the first density. Also, the first density may be greater than the second density.

In another exemplary embodiment, a method of producing a thermal bonding of the non-woven fibers as a filter medium for filtering a fluid may include constructing a first nonwoven sliver from a first set of synthetic blended staple fibers having different staple fiber lengths and include single-component or bi-component fibers as binder fibers. Further, the method may include constructing a second nonwoven sliver from a second set of synthetic staple fibers to include single-component or bi-component fibers as binder fibers having different staple fiber lengths and a second density. Also, the method may include combining the first nonwoven sliver and the second nonwoven sliver to obtain a combined material. Finally, the method may include forming the combined material into a predetermined shape to obtain the filter medium, wherein the filter medium has a core with substantially the first density. Also, the first density may be greater than the second density.

In another exemplary embodiment, a filter for filtering a fluid may be configured to include a housing, a fluid inlet coupled to the housing, a fluid outlet coupled to the housing, and a filter media. The filter media may be configured to include a plurality of filter mediums disposed in the housing and may be used to filter the fluid from the fluid inlet and output the filtered fluid to the fluid outlet. Each of the filter mediums may be configured to include a first nonwoven sliver composed of a first set of synthetic staple fibers having different staple fiber lengths and a first density, and a second nonwoven sliver composed of a second set of synthetic staple fibers having different staple fiber lengths and a second density. Further, the first nonwoven sliver and the second nonwoven sliver may be combined to form a predetermined shape having a core with at least the first density. Also, the first density may be greater than the second density.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure.

FIG. 13 is another embodiment of a method of filtering particulate matter from a fluid using a filter medium with various aspects described herein.

FIG. 14 is a table providing measurements of fiber migration of one embodiment of a filter medium as described herein compared to commercially available filter medium.

DETAILED DESCRIPTION

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for filter media and the manufacture thereof. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Figure 1:
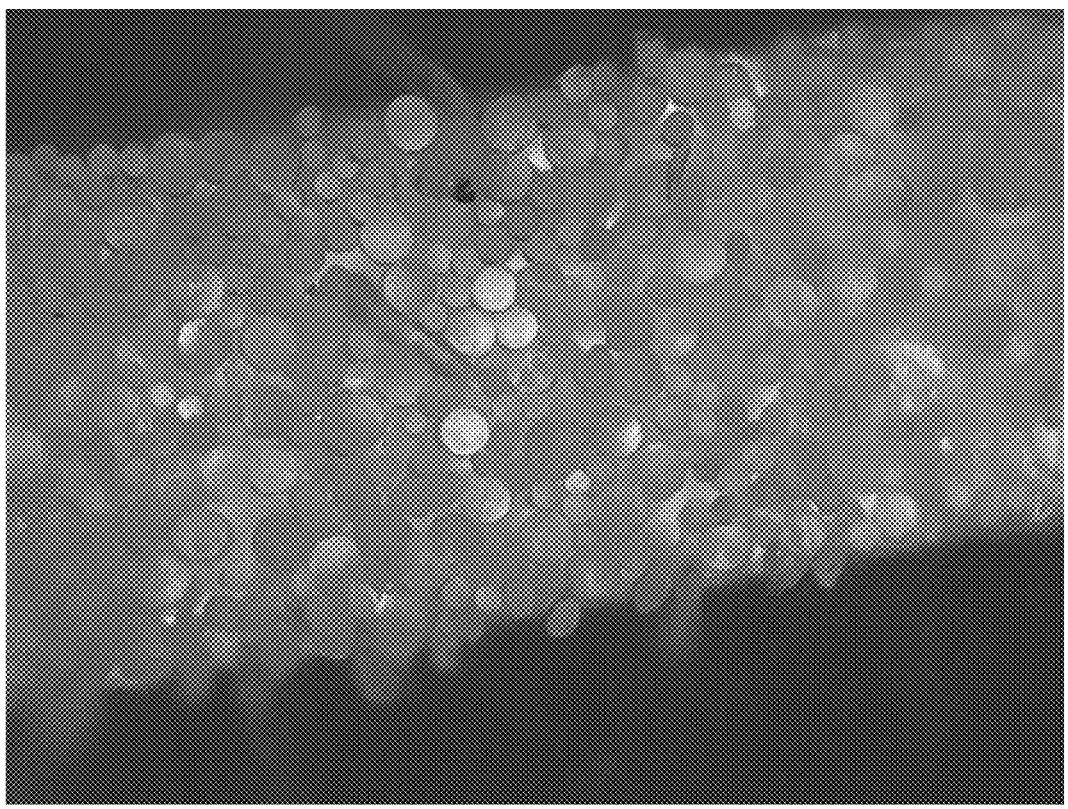
FIG. 1 is a cross-sectional view of one embodiment of a nonwoven sliver with various aspects described herein.

FIG. 1 is a cross-sectional view of one embodiment of a nonwoven sliver 100 with various aspects described herein. FIG. 1 shows that the nonwoven sliver 100 is composed of synthetic stapled fibers having various deniers, colors and translucencies.

Figure 2:
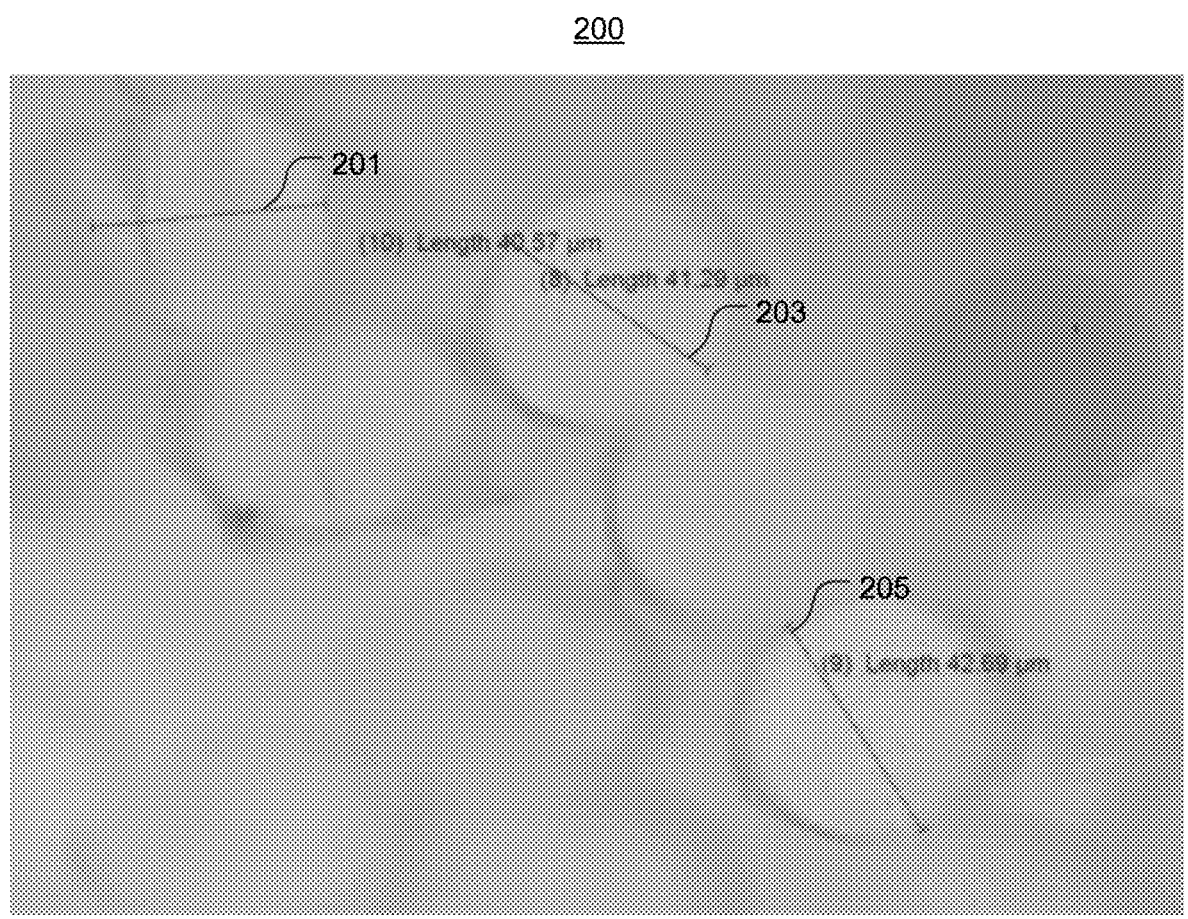
FIG. 2 is a cross-sectional view of another embodiment of a nonwoven sliver with various aspects described herein.

FIG. 2 is a cross-sectional view of another embodiment of a nonwoven sliver 200 with various aspects described herein. FIG. 2 shows that the nonwoven sliver 200 is composed of synthetic stapled fibers having various diameters 201, 203 and 205. For example, one of the synthetic stapled fibers has a diameter 203 of 41.29 micrometers (41.29 μm).

Figure 3:
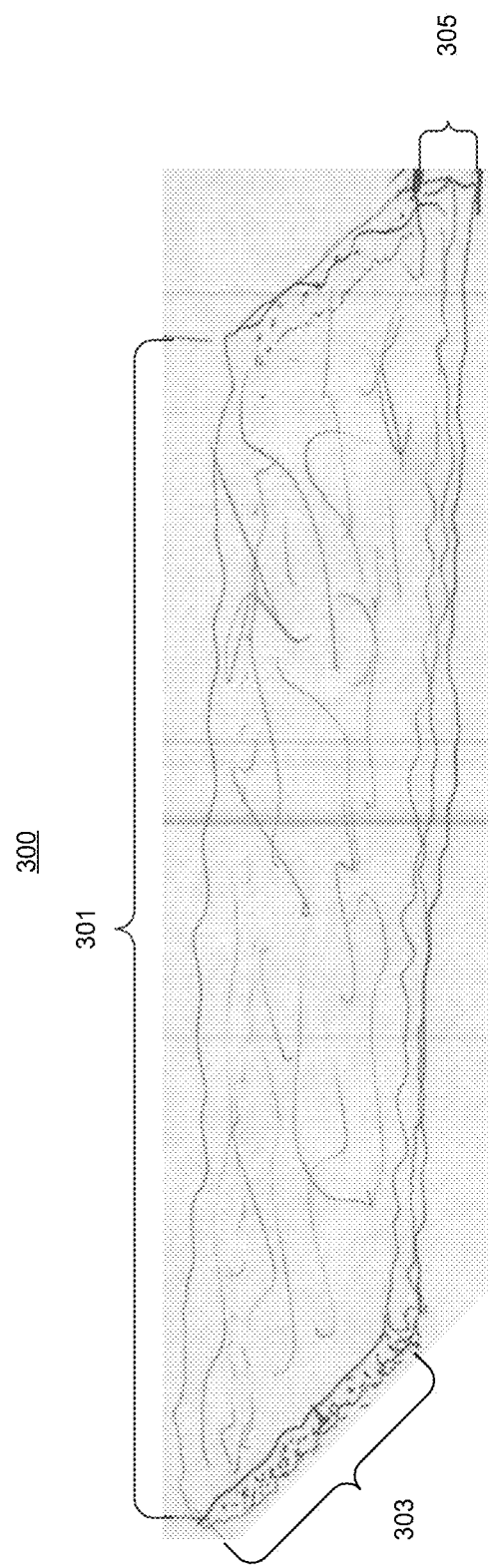
FIG. 3 is a perspective view of one embodiment of a nonwoven sliver with various aspects described herein.

FIG. 3 is a perspective view of one embodiment of a nonwoven sliver 300 with various aspects described herein. In FIG. 3, the nonwoven sliver 300 may be represented by dimensions of length 301, width 303, and thickness 305. In one example, the nonwoven sliver 300 may have a length 301 in a range from about two inches to about twenty-four inches. In another example, the nonwoven sliver 300 may have a width 303 in a range from about one inch to about six inches. In another example, the nonwoven sliver 300 may have a thickness 305 in a range from about 1/64 of an inch to about ½ of an inch.

Figure 4:
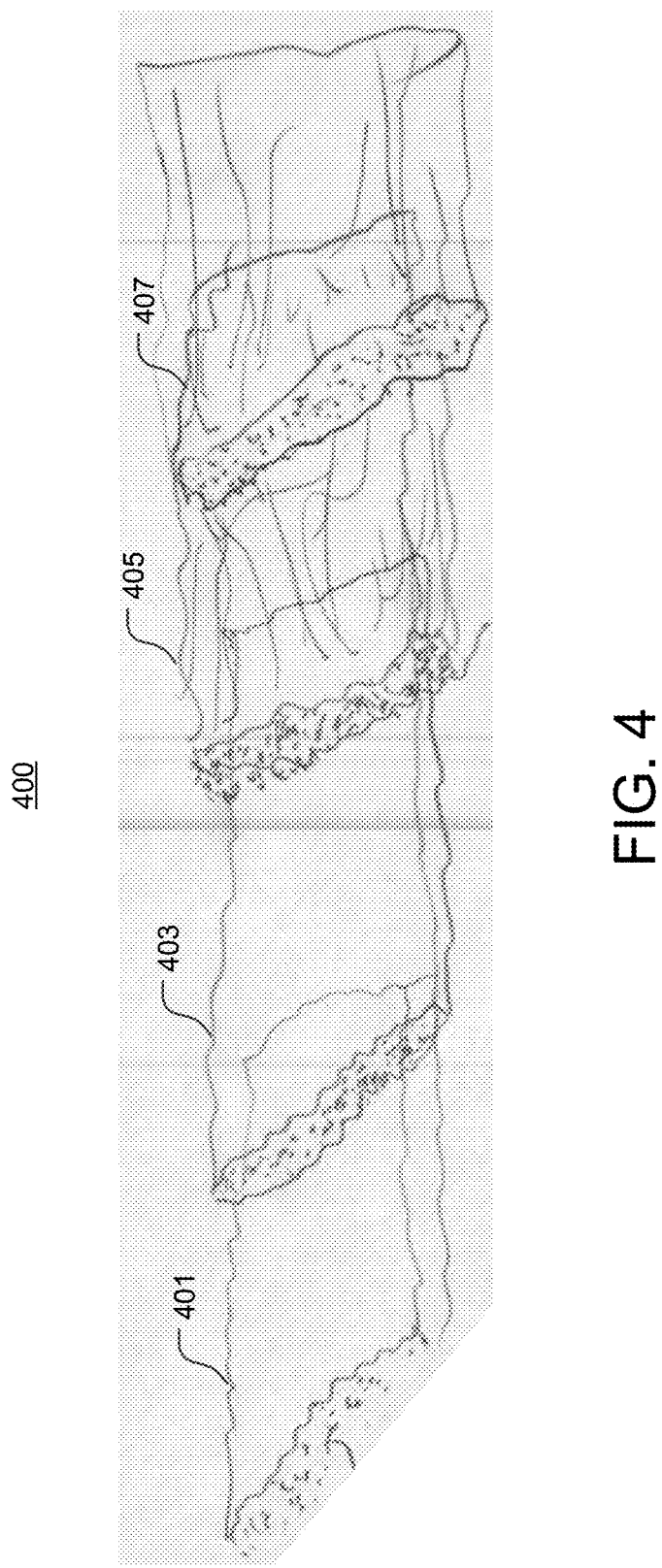
FIG. 4 is a perspective view of one embodiment of combined material with various aspects described herein.

FIG. 4 is a perspective view of one embodiment of combined material 400 with various aspects described herein. In FIG. 4, the combined material 400 may be formed by partially overlaying a plurality of nonwoven slivers 401, 403, 405 and 407. Each of the plurality of nonwoven slivers 401, 403, 405 and 407 may be composed of synthetic staple fibers having various deniers or densities. Further, each of the synthetic staple fibers may be a polymeric or non-polymeric thermoplastic fiber. Also, each of the plurality of nonwoven slivers may be of various dimensions. In one example, each of the plurality of nonwoven slivers 401, 403, 405 and 407 has a different length. In another example, each of the plurality of nonwoven slivers 401, 403, 405 and 407 has a different thickness. In another example, each of the plurality of nonwoven slivers 401, 403, 405 and 407 has a different denier.

Figure 5:
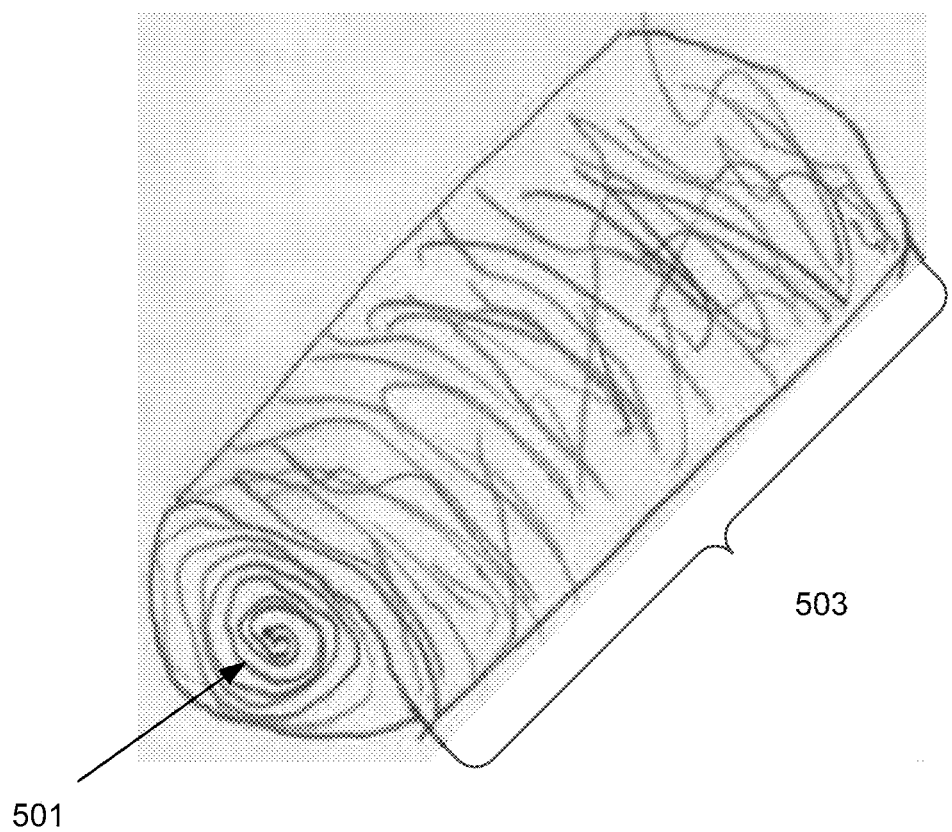
FIG. 5 is a perspective view of one embodiment of a filter medium with various aspects described herein.

FIG. 5 is a perspective view of one embodiment of a filter medium 500 with various aspects described herein. In FIG. 5, the filter medium 500 may have a width 503 in a range from about two inches to about six inches. A single nonwoven sliver or a combined material having a plurality of nonwoven slivers may be formed into a predetermined shape such as a cylinder or a sphere to obtain the filter medium 500. A core 501 of the filter medium 500 is a portion of the filter medium 500 that is disposed near a longitudinal center axis of the filter medium 500.

Figure 6:
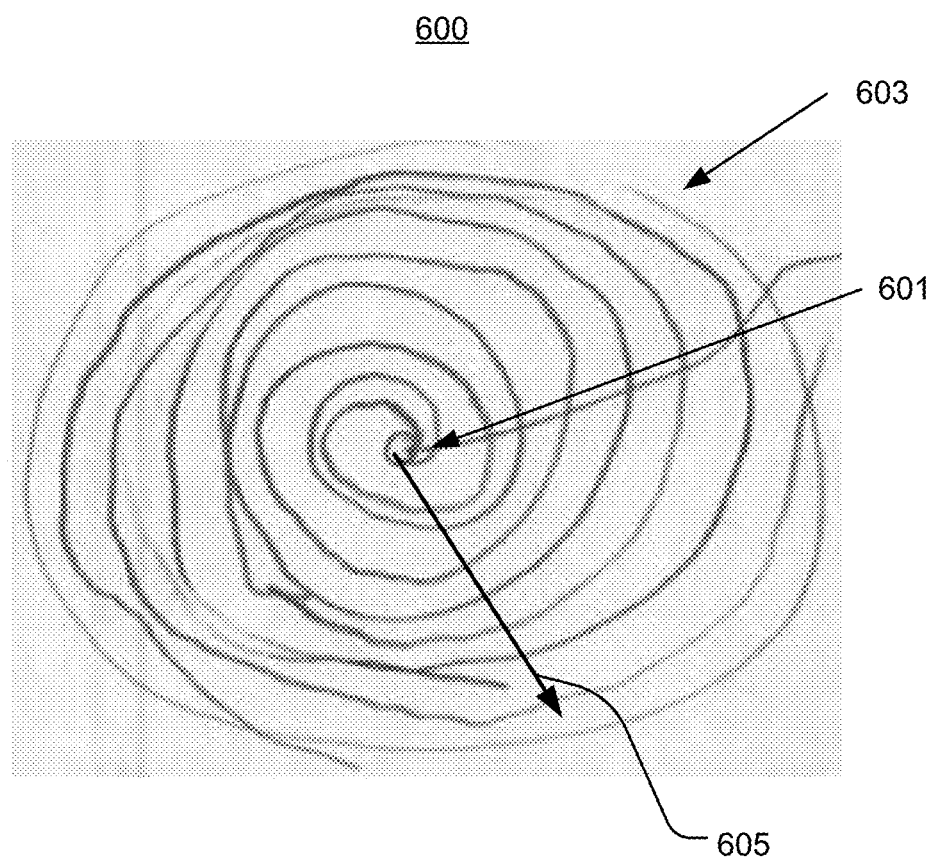
FIG. 6 is a side view of another embodiment of a filter medium with various aspects described herein.

FIG. 6 is a side view of another embodiment of a filter medium 600 with various aspects described herein. In FIG. 6, a core 601 of the filter medium 600 may have a variable density or a variable thickness. Further, a density gradient 605 is defined from the core 601 of the filter medium 500 to an outer surface or side 603 of the filter medium 600.

In another embodiment, a filter medium may be formed by fully overlaying a plurality of nonwoven slivers. For such structure, a density gradient may be about uniform from a core of the filter medium to a surface of the filter medium.

In another embodiment, a filter medium may be formed by partially overlaying a plurality of nonwoven slivers. For such structure, a density gradient may vary from a core of the filter medium to a surface of the filter medium dependent on the density of each of the plurality of nonwoven slivers. For example, a core of a filter medium having a first density and an outer wrap of the filter medium having a second density would result in a density gradient varying from the first density to the second density.

Figure 7:
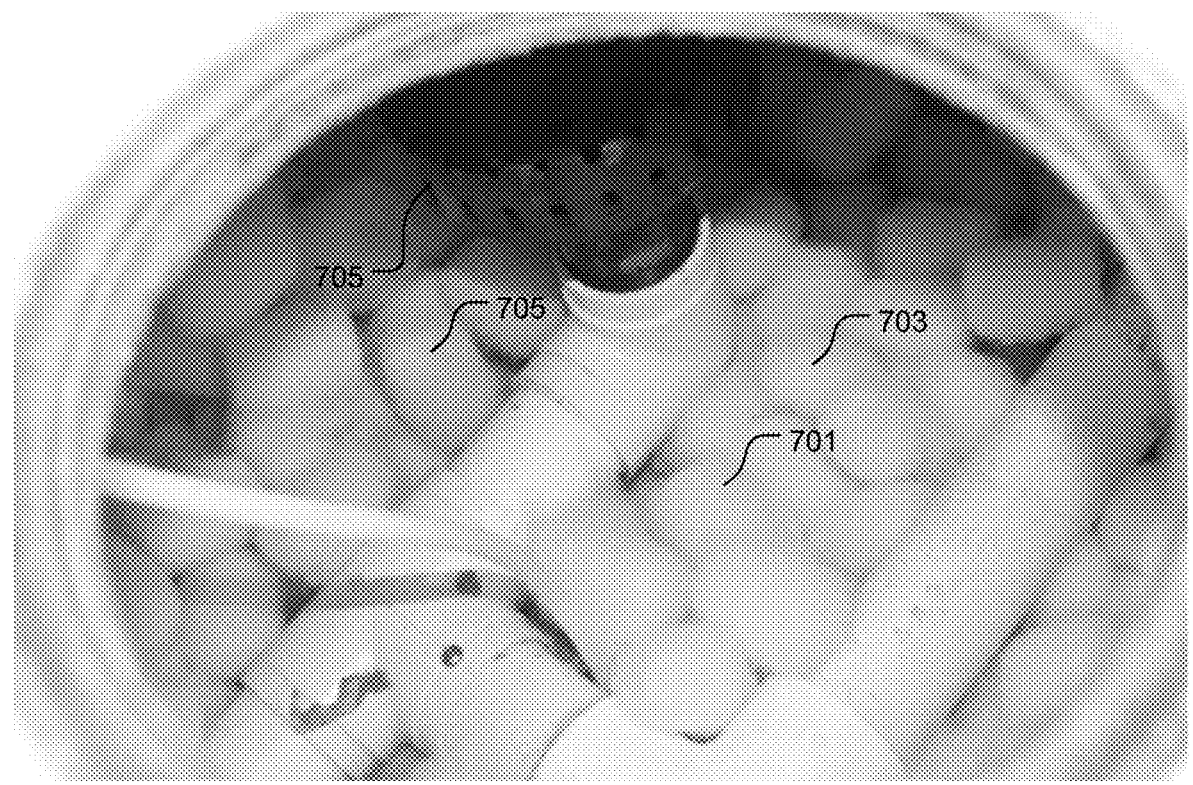
FIG. 7 shows a top view of one embodiment of a filter system having filter media with various aspects described herein.

FIG. 7 shows a top view of one embodiment of a filter system 700 having filter media with various aspects described herein. In FIG. 7, the filter system 700 includes an inlet port (not shown), an outlet port 705 and a plurality of filter media 701, 702 and 703. The outlet 705 may be positioned near a top of the filter system 700 and may output a fluid having particulate matter. The plurality of filter media 701, 702 and 703 may then filter the particulate matter from the fluid to obtain a filtered fluid. In one example, the plurality of filter media 701, 702 and 703 may be contiguous within the filter 700 system. The inlet port may be positioned near a bottom of the filter system 700 and may output the filtered fluid.

Figure 8:
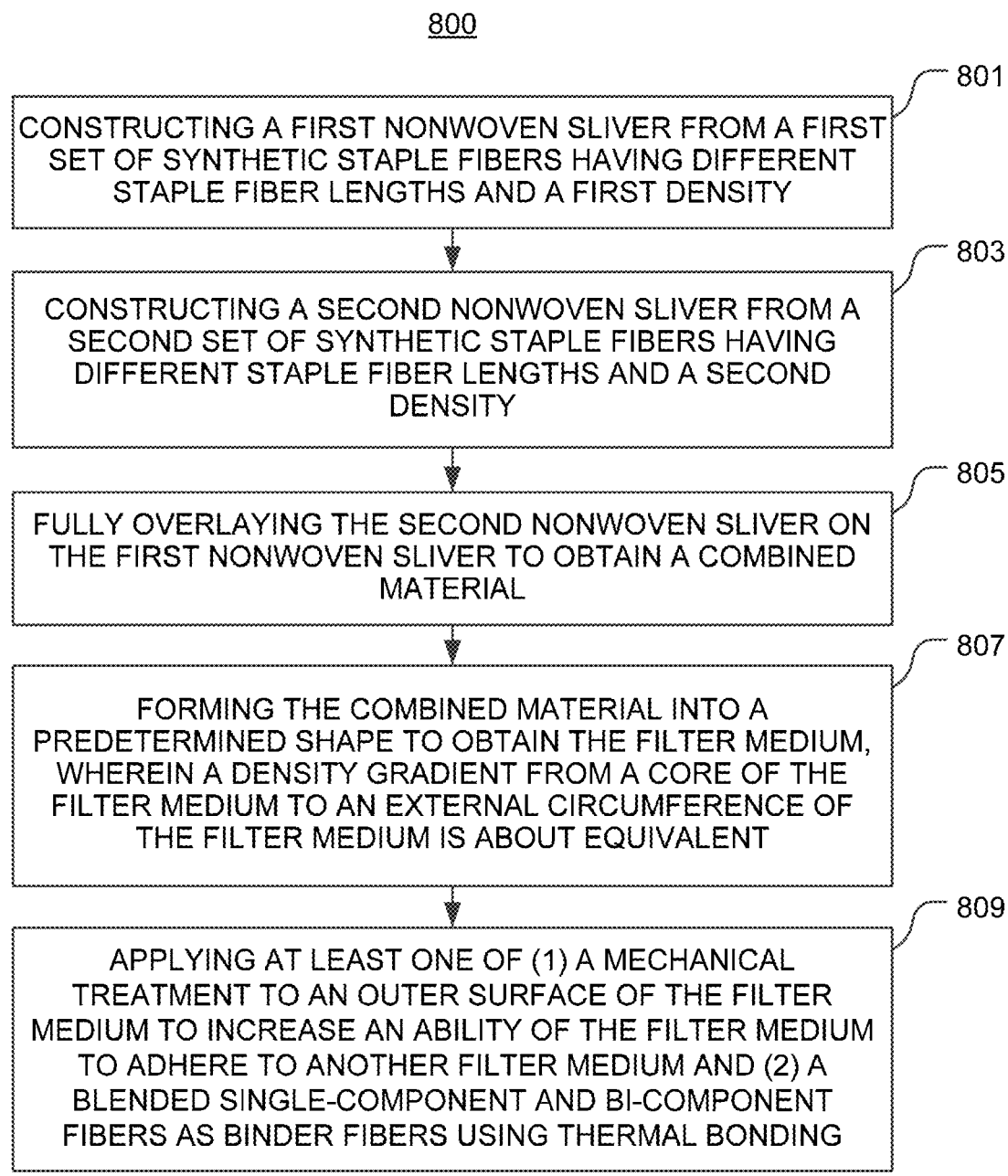
FIG. 8 is one embodiment of a method of producing a filter medium for filtering particulate matter from a fluid with various aspects described herein.

FIG. 8 is one embodiment of a method 800 of producing a filter medium for filtering particulate matter from a fluid with various aspects described herein. In FIG. 8, the method 800 may start, for instance, at block 801 where the method 800 may include constructing a first nonwoven sliver from a first set of synthetic staple fibers having different staple fiber lengths and a first density. At block 803, the method 800 may include constructing a second nonwoven sliver from a second set of synthetic staple fibers having different staple fiber lengths and a second density. At block 805, the method 800 may include fully overlaying the second nonwoven sliver on the first nonwoven sliver to obtain a combined material. At block 807, the method 800 may include forming the combined material into a predetermined shape to obtain the filter medium, wherein a density gradient from a core of the filter medium to an external circumference of the filter medium is about equivalent. At block 809, the method 800 may include applying a mechanical treatment to an outer surface of the filter medium or to the fibers, individually or collectively. In one example, the mechanical treatment may be applied to convert the outer surface of the filter medium or the fibers to be oleophilic, oleophobic, hydrophilic, or hydrophobic. Further the method 800 may include applying another mechanical treatment to blended single-component or bi-component fibers as binder fibers for thermal bonding to increase an ability of the filer medium to adhere to another filter medium.

Figure 9:
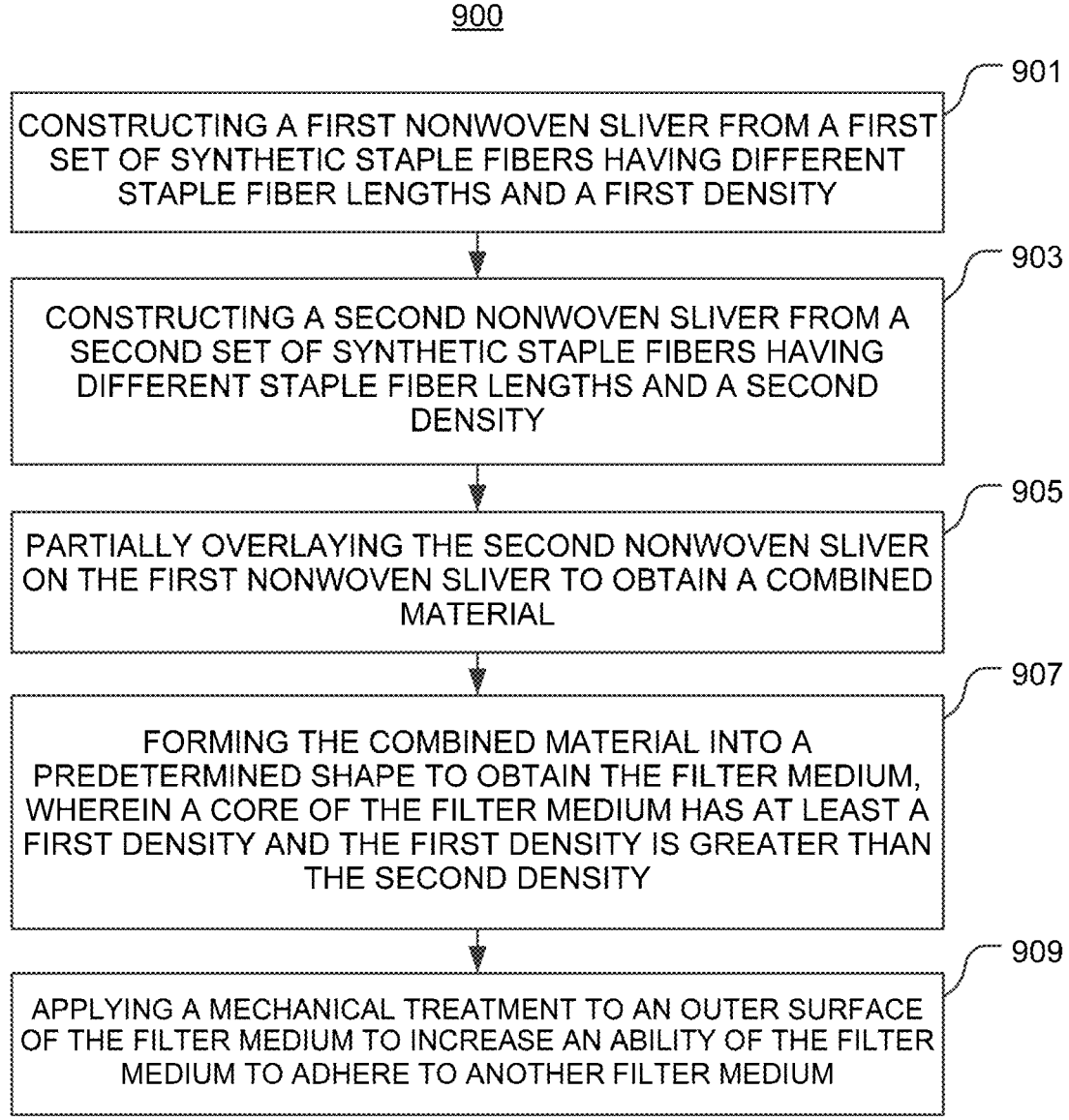
FIG. 9 is another embodiment of a method of producing a filter medium for filtering particulate matter from a fluid with various aspects described herein.

FIG. 9 is another embodiment of a method 900 of producing a filter medium for filtering particulate matter from a fluid with various aspects described herein. In FIG. 9, the method 900 may start, for instance, at block 901 where the method 900 may include constructing a first nonwoven sliver from a first set of synthetic staple fibers having different staple fiber lengths and a first density. At block 903, the method 900 may include constructing a second nonwoven sliver from a second set of synthetic staple fibers having different staple fiber lengths and a second density. At block 905, the method 900 may include partially overlaying the second nonwoven sliver on the first nonwoven sliver to obtain a combined material. At block 907, the method 900 may include forming the combined material into a predetermined shape to obtain the filter medium. Further, a core of the filter medium may have at least a first density. Also, the first density may be greater than the second density. At block 909, the method 900 may include applying a mechanical treatment to an outer surface of the filter medium or to the fibers, individually or collectively, to increase cohesion to another filter medium or other fibers.

Figure 10:
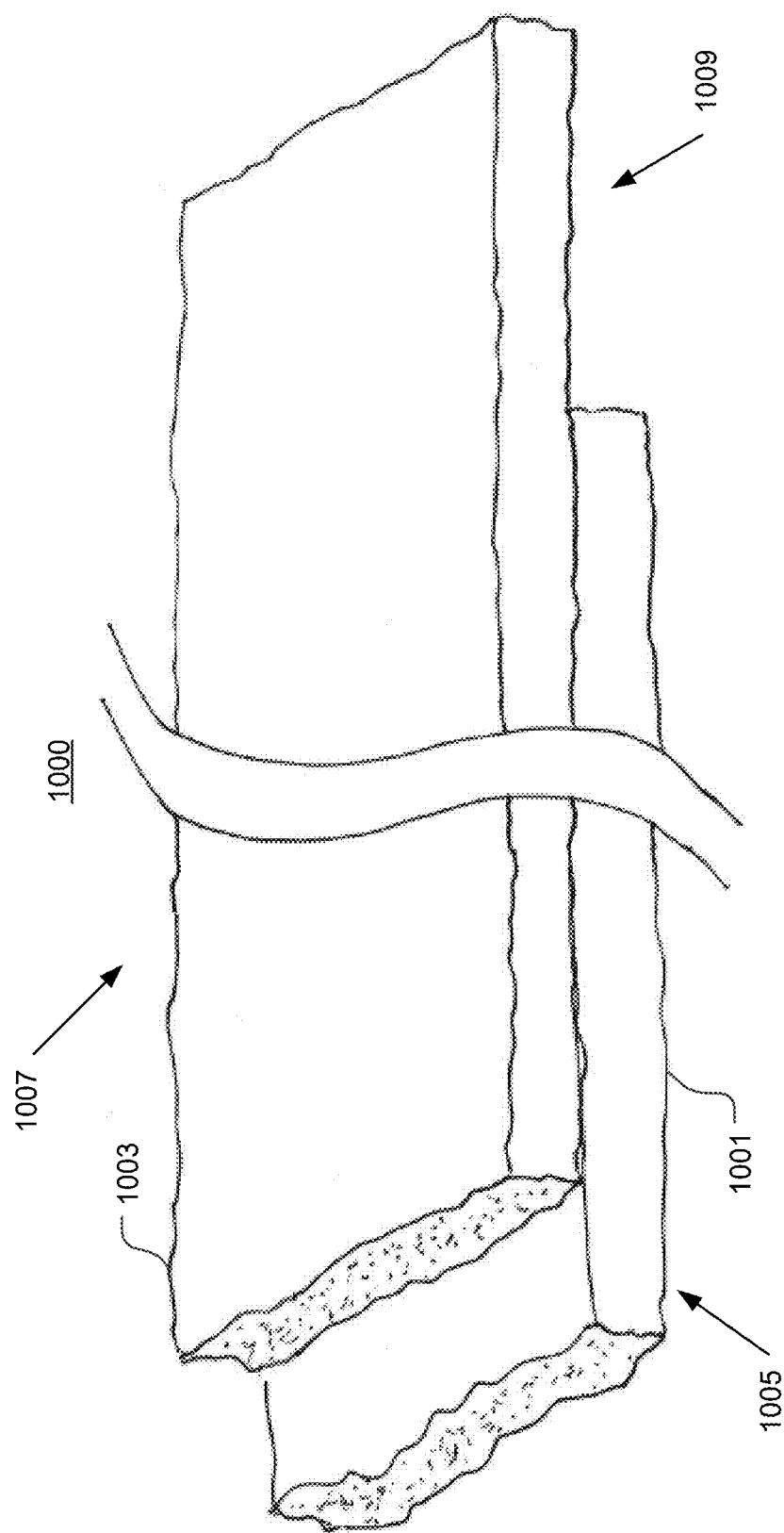
FIG. 10 is a perspective view of another embodiment of combined material with various aspects described herein.

FIG. 10 is a perspective view of another embodiment of combined material 1000 with various aspects described herein. In FIG. 10, the combined material 1000 may be configured to include a first nonwoven sliver 1001 and a second nonwoven sliver 1003. The second nonwoven sliver 1003 may be partially overlaid on the first nonwoven sliver 1001 to form a first non-overlaid portion 1005 associated with the first nonwoven sliver 1001, an overlaid portion 1007 associated with the first and second nonwoven slivers 1001 and 1003, and a second non-overlaid portion 1009 associated with the second nonwoven sliver 1003. The combined material 1000 may be formed into a filter medium having a predetermined shape with the first non-overlaid portion 1005 forming an inner wrap disposed at a core of the filter medium and the second non-overlaid portion 1009 forming an outer wrap disposed at an outer surface or a side surface of the filter medium. Further, the overlaid portion 1007 may be disposed between the core of the filter medium and the outer wrap of the filter medium.

Figure 11:
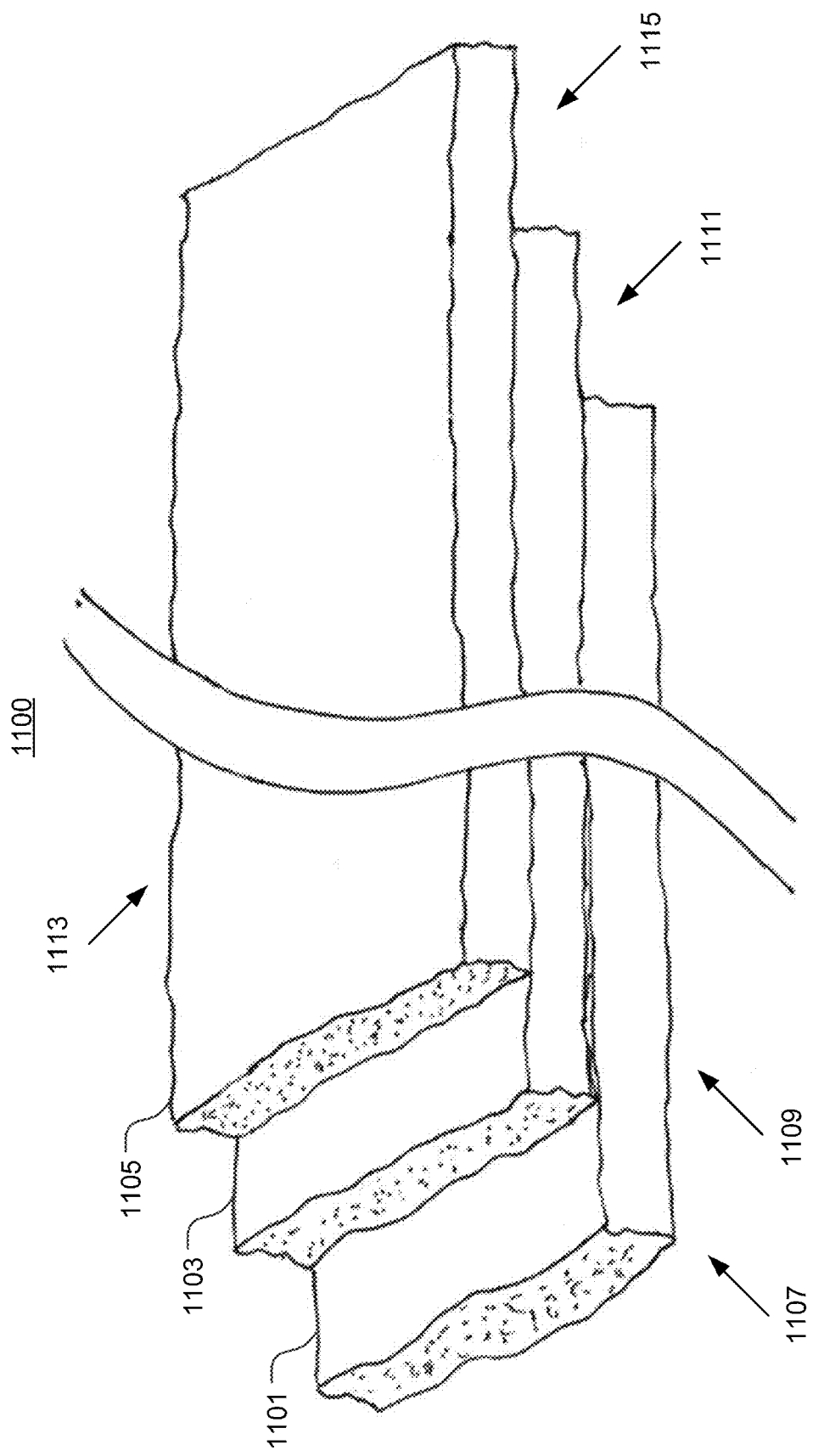
FIG. 11 is a perspective view of another embodiment of combined material with various aspects described herein.

FIG. 11 is a perspective view of another embodiment of combined material 1100 with various aspects described herein. In FIG. 11, the combined material 1100 may be configured to include a first nonwoven sliver 1101, a second nonwoven sliver 1103, and a third nonwoven sliver 1105. The second nonwoven sliver 1103 may be partially overlaid on the first nonwoven sliver 1101 to form a first non-overlaid portion 1107 associated with the first nonwoven sliver and a first overlaid portion 1109 associated with the first nonwoven sliver 1101 and the second nonwoven sliver 1103. The third nonwoven sliver 1105 may be overlaid on the first and second nonwoven slivers 1101 and 1103 to form a second overlaid portion 1111 associated with the second and third nonwoven slivers 1103 and 1105, a third overlaid portion 1113 associated with the first, second and third nonwoven slivers 1101, 1103 and 1105 and a second non-overlaid portion 1115 associated with the third nonwoven sliver 1105. The combined material 1100 may be formed into a filter medium having a predetermined shape with the first non-overlaid portion 1107 forming a first inner wrap disposed at a core of the filter medium, the first overlaid portion 1109 forming a second inner wrap disposed near the core of the filter medium, the second non-overlaid portion 1115 forming a first outer wrap disposed at an outer surface or side surface of the filter medium, and the second overlaid portion 1111 forming a second outer wrap disposed near the outer surface or side surface of the filter medium. Further, the third overlaid portion 1113 may be disposed between the second inner wrap of the filter medium and the second outer wrap of the filter medium.

Figure 12:
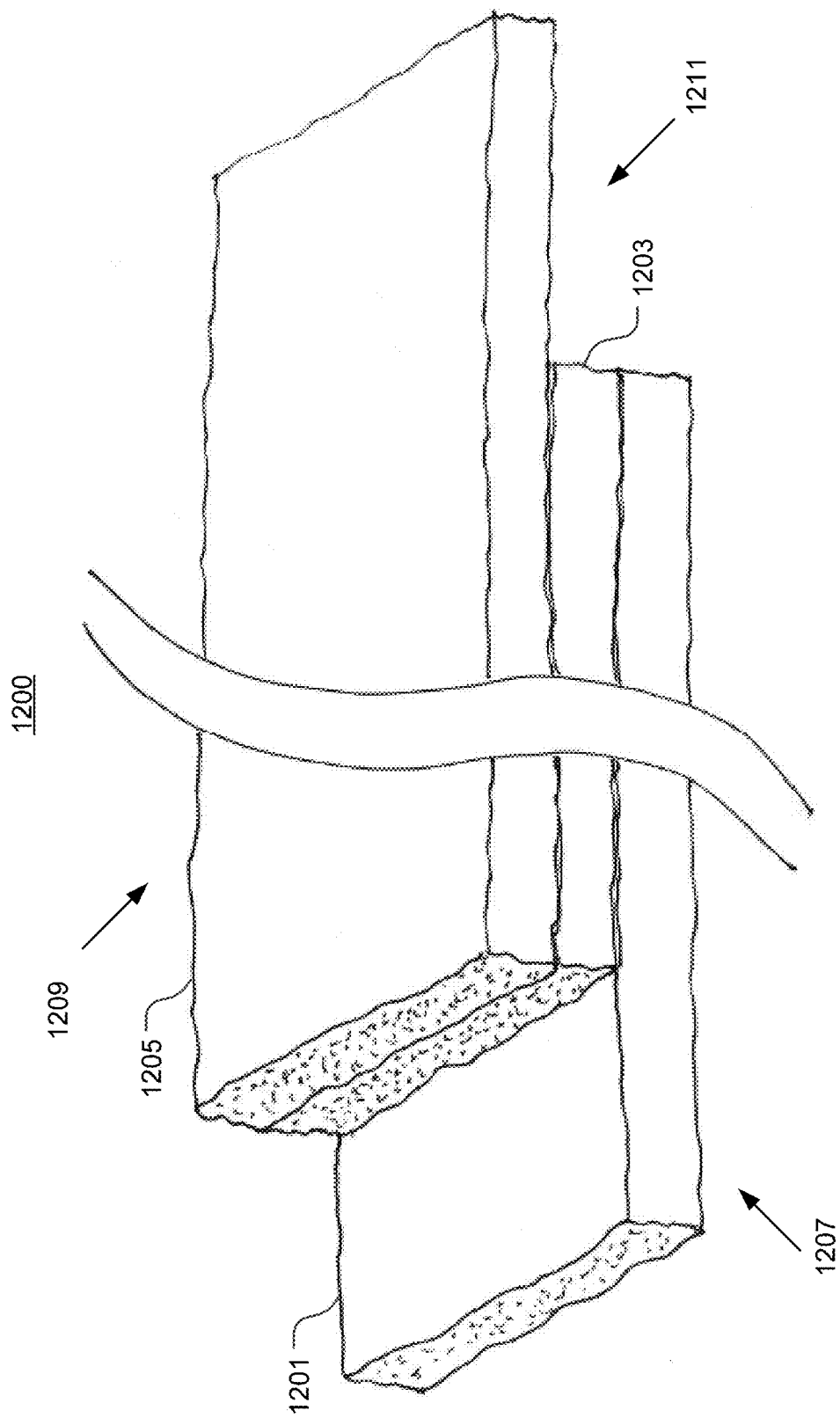
FIG. 12 is a perspective view of another embodiment of combined material with various aspects described herein.

FIG. 12 is a perspective view of another embodiment of combined material 1200 with various aspects described herein. In FIG. 12, the combined material 1200 may be configured to include a first nonwoven sliver 1201, a second nonwoven sliver 1203, and a third nonwoven sliver 1205. The second nonwoven sliver 1203 may be partially overlaid on the first nonwoven sliver 1201 to form a first non-overlaid portion 1207 associated with the first nonwoven sliver 1201. The third nonwoven sliver 1205 may be partially overlaid on the first and second nonwoven slivers 1201 and 1203 to form an overlaid portion 1209 associated with the first, second and third nonwoven slivers 1201, 1203 and 1205, and a second non-overlaid portion 1211 associated with the third nonwoven sliver 1205. The combined material 1200 may be formed into a filter medium having a predetermined shape with the first non-overlaid portion 1207 forming an inner wrap disposed at a core of the filter medium and the second non-overlaid portion 1211 forming an outer wrap disposed at a side surface of the filter medium. Further, the overlaid portion 1109 may be disposed between the inner wrap of the filter medium and the outer wrap of the filter medium.

In another embodiment, an outer wrap of the filter medium may have the second density.

In one embodiment, a filter medium may be composed of polymeric and non-polymeric resin-based thermoplastic fibers that are manipulated by extruding or melt blown then carding, sorting and rolling into a predetermined shape such as a cylinder or a sphere and capable of filtering particulate matter from a fluid such as a process liquid, water or gas.

In another embodiment, a filter medium may be composed of polymeric or non-polymeric thermoplastic fibers in various deniers (including micro deniers) and various dimensional profiles. Further, the thermoplastic fibers may be constructed into a sliver and formed into a filter medium having a shape such as a sphere, a cylinder or the like. Also, the filter medium may be combined with another filter medium to form a filter media to filter a fluid.

In another embodiment, a thermoplastic fiber may have a denier in the range of 0.1 denier (0.1 D) to fifty denier (50 D).

In another embodiment, a nonwoven sliver may be constructed from staple fibers that range in length from about two inches to about six inches. The staple fibers may then be crimped and folded to have a cross-locking characteristic. The combination of the length of the fibers and the crimping of the fibers may eliminate shedding of fiber material during use, resulting in reducing or eliminating fiber migration during filtering of a fluid.

In another embodiment, a filter medium may be constructed using one or more nonwoven slivers with each sliver having a different density. Further, each sliver may have fibers having different deniers.

In another embodiment, one or more nonwoven slivers may be initially rolled tighter to form a core of a filter medium that is denser and has a higher concentration of smaller fibers than an outer wrap of the filter medium. This construction may allow for targeting the filter media for specific micron retention capabilities.

In another embodiment, an outer surface area of a filter medium may be prepared during a carding process to achieve a roughness coefficient that may allow a filter medium to bond with another filter medium. The ability for the filter medium to bond with the other filter medium may also be associated with a vibratory nature of an inlet flow and a wetting process, resulting in positioning each filter medium against each other. During a back-flush cycle, a reverse action or separation of each filter medium may be performed using a back-flush pressure and a fluid flow that may release trapped particulate matter from each filter medium and may discharge this particulate matter into a waste drain, resulting in rejuvenating or cleaning each filter medium.

A typical use of a filter media as disclosed herein may be as a replacement media for filter sand and other granular bed media vessels. These types of filters are typically closed systems that use backwashing instead of media replacement to regenerate the filtering capabilities of the filter media. A filter media capable of backwashing generally relies on a high velocity of a fluid through the filter media to regenerate the filtering capabilities of the filter media. The filter media as disclosed herein allows for the filtration or removal of fine particulate matter to a low level.

In one embodiment, a filter medium for filtering particulate matter from a fluid may be configured to include a nonwoven sliver having a certain density and may be formed into a predetermined shape for filtering particulate matter from the fluid. Further, the nonwoven sliver may be composed of first synthetic staple fibers having a first staple fiber length and a first denier, and second synthetic staple fibers having a second staple fiber length and a second denier. Also, a portion of the first synthetic staple fibers may be crimped with a portion of the second synthetic staple fibers.

In another embodiment, a filter medium for filtering particulate matter from a fluid may be configured to include a first nonwoven sliver composed of a first set of synthetic staple fibers having different staple fiber lengths and a first density, and a second nonwoven sliver composed of a second set of synthetic staple fibers having different staple fiber lengths and a second density. Further, the first nonwoven sliver and the second nonwoven sliver may be combined to form a predetermined shape having a core with a density of at least the first density. Also, the first density may be greater than the second density.

In another embodiment, the second nonwoven sliver may be partially overlaid on the first nonwoven sliver and combined to form the predetermined shape so that the first nonwoven sliver may be substantially disposed in a core of the predetermined shape.

In another embodiment, the first density may be in a range from about 0.01 g/cm3 to about 0.2 g/cm3.

In another embodiment, the second density may be in a range from about 0.01 g/cm3 to about 0.2 g/cm3.

In another embodiment, the first set of synthetic staple fibers may be composed of first synthetic staple fibers having a first staple fiber length and second synthetic staple fibers having a second staple fiber length. In one example, a first set of synthetic staple fibers may be composed of a first synthetic staple fiber having a first staple fiber length of about eighteen inches (18") and may be used to form a filter medium having a predetermined shape of a ball. In another example, a first set of synthetic fibers may be composed of a first synthetic staple fiber having a first staple fiber length of about two inches (2") and a second synthetic staple fiber having a second staple fiber length of about ten inches (10"). Further, a second set of synthetic fibers may be composed of a third synthetic staple fiber having a third staple fiber length of about six inches (6") and a fourth synthetic staple fiber having a staple fiber length of about eight inches (8"). Also, the first set of synthetic staple fibers and the second set of synthetic staple fibers may compose a first nonwoven sliver, which may be used to form a predetermined shape such as a ball.

In another embodiment, the first staple fiber length may be in a range from about two inches (2") to about twenty-four inches (24"), and the second staple fiber length may be in a range from about two inches (2") to about twenty-four inches (24").

In another embodiment, the first set of synthetic staple fibers may be composed of first synthetic staple fibers having a first denier, and second synthetic staple fibers having a second denier.

In another embodiment, the first denier may be in a range from about one denier (1 D) to about one hundred denier (100 D), and the second denier may be in a range from about one denier (1 D) to about one hundred denier (100 D). In one example, first synthetic staple fibers having a first staple fiber length of determined size may have about thirty-five percent (35%) of about six denier (6 D) and about fifteen percent (15%) of about seventeen denier (17 D). In another example, first synthetic staple fibers having a first staple fiber length of determined size may have about forty percent (40%) of about two denier (2 D) and about twenty percent (20%) of about eight denier (8 D). In another example, first synthetic staple fibers having a first staple fiber length of determined size may have about forty percent (40%) of about two denier (2 D). In another example, second synthetic staple fibers having a second staple fiber length of determined size may have about twenty percent (20%) of about eight denier (8 D) and about twenty percent (20%) of about seventeen denier (17 D). In another example, third synthetic staple fibers having a third staple fiber length of determined size may have about thirty percent (30%) of about twelve denier (12 D) and about thirty percent (30%) of about twenty-five denier (25 D). In another example, fourth synthetic staple fibers having a fourth staple length of determined size may include about twenty percent (20%) of about twenty denier (20 D) and about fifteen percent (15%) of about one hundred denier (100 D).

In another embodiment, the first set of synthetic staple fibers may be composed of first synthetic staple fibers having a first average diameter, and second synthetic staple fibers having a second average diameter.

In another embodiment, the first average diameter may be in a range from about three microns (3 μm) to about three hundred microns (300 μm), and the second average diameter may be in a range from about three microns (3 μm) to about five hundred microns (500 μm).

In another embodiment, a portion of the first synthetic staple fibers may be crimped with a portion of the second synthetic staple fibers.

In another embodiment, the second set of synthetic staple fibers may be composed of third synthetic staple fibers having a third staple fiber length, and fourth synthetic staple fibers having a fourth staple fiber length.

In another embodiment, the third staple fiber length may be in a range from about two inches (2") to about twenty-four inches (24"), and the fourth staple fiber length may be in a range from about two inches (2") to about twenty-four inches (24").

In another embodiment, the second set of synthetic staple fibers may be composed of third synthetic staple fibers having a third denier, and fourth synthetic staple fibers having a fourth denier.

In another embodiment, the third denier may be in a range from about one denier (1 D) to about one hundred denier (100 D), and the fourth denier may be in a range from about one denier (1 D) to about one hundred denier (100 D).

In another embodiment, the second set of synthetic staple fibers may be composed of third synthetic staple of fibers having a third average diameter, and fourth synthetic staple of fibers having a fourth average diameter.

In another embodiment, the third average diameter may be in a range from about three microns (3 μm) to about five hundred microns (500 μm), and the fourth average diameter may be in a range from about three microns (3 μm) to about five hundred microns (500 μm).

In another embodiment, a portion of the third synthetic staple of fibers may be crimped with a portion of the fourth synthetic staple fibers.

In another embodiment, the predetermined shape may be a cylinder.

In another embodiment, the predetermined shape may be a sphere.

In another embodiment, an average staple fiber length of the first nonwoven sliver may be less than an average staple fiber length of the second nonwoven sliver.

In another embodiment, the different staple fiber lengths of the first nonwoven sliver may be in a range from about two inches to about six inches.

In another embodiment, the different staple fiber lengths of the second or additional nonwoven sliver(s) may be in a range from about two inches to about six inches.

In another embodiment, a percentage of the first set of synthetic staple fibers in a total volume of the filter medium may be less than about two percent.

In another embodiment, a percentage of the second set of synthetic staple fibers in a total volume of the filter medium may be less than about two percent.

In another embodiment, a percentage of the first set of synthetic staple fibers and the second set of synthetic staple fibers in a total volume of the filter medium may be less than about two percent.

In another embodiment, a percentage of the first set of synthetic staple fibers and the second set of synthetic staple fibers in a total volume of the filter medium may be in a range from about one percent to about two percent.

In another embodiment, the filter medium may have a flow resistance in a range from about one millibar (1 mb) to about fifty millibars (50 mb).

In another embodiment, the filter medium may have a flow resistance in a range from about one millibar (1 mb) to about five hundred millibars (500 mb).

In another embodiment, the filter medium may have a flow resistance in a range from about one millibar (1 mb) to about five millibars (5 mb).

In another embodiment, the filter medium may have a first-pass filtration rate of at least about 99%.

In another embodiment, the synthetic staple fibers may be composed of thermoplastic fibers.

In another embodiment, the thermoplastic fibers may be at least one of polymeric thermoplastic fibers and non-polymeric thermoplastic fibers.

In one embodiment, a method of producing a filter medium for filtering particulate matter from a fluid may include constructing a first nonwoven sliver from a first set of synthetic staple fibers having different staple fiber lengths and a first density. Further, the method may include constructing a second nonwoven sliver from a second set of synthetic staple fibers having different staple fiber lengths and a second density. Also, the method may include overlaying the second nonwoven sliver on the first nonwoven sliver to obtain a combined material. The method may include forming the combined material into a predetermined shape to obtain the filter medium. The filter medium may have a core with substantially the first density. In addition, the first density may be greater than the second density.

In another embodiment, the method may include rolling the combined material into the predetermined shape.

In another embodiment, the method may include overlaying the second nonwoven sliver on a portion of the first nonwoven sliver to form a non-overlaid portion and an overlaid portion of the combined material.

In another embodiment, the method may include rolling the non-overlaid portion of the combined material and then rolling the overlaid portion of the combined material.

In another embodiment, the method may include rolling the non-overlaid portion of the combined material tighter than rolling the overlaid portion of the combined material.

In another embodiment, the method may include overlaying the second nonwoven sliver on a portion of the first nonwoven sliver to form a first non-overlaid portion associated with the first nonwoven sliver, an overlaid portion and a second non-overlaid portion associated with the second nonwoven sliver of the combined material.

In another embodiment, the method may include rolling the second non-overlaid portion of the combined material.

In another embodiment, the method may include rolling the second non-overlaid portion of the combined material after rolling the first non-overlaid portion and the overlaid portion of the combined material.

In another embodiment, the method may include applying a mechanical treatment to an outer surface of the filter medium to increase an ability of the filter medium to adhere to another filter medium.

In another embodiment, the method may include applying at least one of (1) a mechanical treatment to an outer surface of the filter medium to increase an ability of the filter medium to adhere to another filter medium and (2) a blended single-component and bi-component fibers as binder fibers using thermal bonding.

In another embodiment, the method may include applying a blended single-component and bi-component fibers as binder fibers using thermal bonding.

In another embodiment, the filter medium is capable of filtering the particulate matter with a grain size in a range from one micron to five microns.

In another embodiment, the filter medium is capable of filtering the particulate matter with a grain size in a range from one micron to one thousand microns.

In one embodiment, a filter for filtering a fluid may be configured to include a housing, a fluid inlet coupled to the housing, a fluid outlet coupled to the housing, and a filter media. The filter media may be composed of a plurality of filter mediums disposed in the housing and used to filter the fluid from the fluid inlet and output the filtered fluid to the fluid outlet. Each of the plurality of filter mediums may be configured to include a first nonwoven sliver composed of a first set of synthetic staple fibers having different staple fiber lengths and a first density, and a second nonwoven sliver composed of a second set of synthetic staple fibers having different staple fiber lengths and a second density. Further, the first nonwoven sliver and the second nonwoven sliver may be combined to form a predetermined shape having a core with at least the first density. Also, the first density may be greater than the second density.

In another embodiment, a method of producing a filter medium for filtering particulate matter from a fluid may include constructing a first nonwoven sliver from a first set of oleophillic or hyrdophobic synthetic staple fibers having different staple fiber lengths and a first density. Further, the method may include constructing a second nonwoven sliver from a second set of oleophobic or hydrophillic synthetic staple fibers having different staple fiber lengths and a second density. Also, the method may include overlaying the second nonwoven sliver on the first nonwoven sliver to obtain a combined material. In addition, the method may include forming the combined material into a predetermined shape to obtain the filter medium. The filter medium may have a core with substantially the first density. In addition, the first density may be greater than the second density.

In another embodiment, a method of producing a filter medium for filtering particulate matter from a fluid may include constructing a nonwoven sliver from a first set of oleophillic or hydrophobic synthetic staple fibers having different staple fiber lengths and a first density.

In another embodiment, a method of producing a filter medium for filtering particulate matter from a fluid may include constructing a nonwoven sliver from a first set of oleophobic or hydrophillic synthetic staple fibers having different staple lengths and a first density.

In another embodiment, a set of staple fibers may be composed of:
  about ten percent (10%) to about sixty percent (60%) of about six denier (6 D) synthetic fibers;
  about ten percent (10%) to about sixty percent (60%) of about seventeen denier (17 D) synthetic fibers; and
  about ten percent (10%) to about forty percent (40%) of about twenty-five denier (25 D) to about thirty denier (30 D) synthetic fibers.

In another embodiment, a set of staple fibers may be composed of:
  about ten percent (10%) to about sixty percent (60%) of about three denier (3 D) synthetic fibers;
  about ten percent (10%) to about sixty percent (60%) of about twenty denier (20 D) synthetic fibers; and
  about ten percent (10%) to about forty percent (40%) of about twenty-five denier (25 D) to about forty denier (40 D) synthetic fibers.

In another embodiment, a set of staple fibers may be composed of:
  about ten percent (10%) to about sixty percent (60%) of about two denier (2 D) synthetic fibers;
  about ten percent (10%) to about sixty percent (60%) of about twenty denier (20 D) synthetic fibers; and about ten percent (10%) to about forty percent (40%) of about twenty-five denier (25 D) to about forty denier (40 D) synthetic fibers.

In another embodiment, a set of staple fibers may be composed of:
about ten percent (10%) to about sixty percent (60%) of about two denier (2 D) to about six denier (6 D) synthetic fibers;
about ten percent (10%) to about sixty percent (60%) of ten denier (10 D) to seventeen denier (17 D) synthetic fibers;
about ten percent (10%) to about sixty percent (60%) of about twenty denier (20 D) synthetic fibers; and
about ten percent (10%) to about sixty percent (60%) of about twenty-five denier (25 D) to about forty denier (40 D) synthetic fibers.

In another embodiment, a set of staple fibers may be composed of:
about ten percent (10%) to about sixty percent (60%) of about one denier (1 D) to about ten denier (10 D) synthetic fibers;
about ten percent (10%) to about sixty percent (60%) of ten denier (10 D) to twenty denier (20 D) synthetic fibers;
about ten percent (10%) to about sixty percent (60%) of about twenty denier (20 D) to about twenty-five denier (25 D) synthetic fibers; and
about ten percent (10%) to about sixty percent (60%) of about twenty-five denier (25 D) to about forty denier (40 D) synthetic fibers.

In another embodiment, a synthetic fiber may be a thermoplastic synthetic fiber.

In another embodiment, a synthetic staple fiber may range from about two inches (2") to about six inches (6") in length.

In another embodiment, a synthetic staple fiber may be crimped.

In another embodiment, a sliver may be formed into a predetermined shape having a core of a first density and an outer wrap of a second density.

In another embodiment, a sliver may include a set of staple fibers.

In another embodiment, a sliver may include synthetic fibers of variable denier.

In another embodiment, a sliver may include Cobalt 58, Cobalt 60 or Cesium isotope reduction enhancements impregnated or embedded within the synthetic fibers of the sliver.

In another embodiment, a synthetic staple fiber may be oleophillic.

In another embodiment, a synthetic staple fiber may be hydrophobic.

In another embodiment, a filter medium may be composed of one sliver.

In another embodiment, a filter medium may be composed of a plurality of slivers.

FIG. 13 is another embodiment of a method 1300 of filtering particulate matter from a fluid using a filter medium with various aspects described herein. In FIG. 13, the method 1300 may include filtering, by a filter medium, the particulate matter from the fluid. Further, the filter medium may include a nonwoven sliver formed into a predetermined shape and composed of first synthetic staple fibers having a first denier, second synthetic staple fibers having a second denier, and third synthetic staple fibers having a third denier. In one example, the first synthetic staple fibers may have the first denier of about six (6) denier, the second synthetic staple fibers may have the second denier of about seventeen (17) denier, and the third synthetic staple fibers may have the third denier of about forty-five (45) denier. In another example, the first synthetic staple fibers may have the first denier of about six (6) denier, the second synthetic stable fibers may have the second denier of about seventeen (17) denier, and the third synthetic stable fibers may have the third denier of about twenty-five (25) denier. In another example, the first synthetic stable fibers may have the first denier of about six (6) denier, the second synthetic stable fibers may have the second denier of about seventeen (17) denier, and the third synthetic staple fibers may have the third denier of about forty (40) denier. Also, the filter medium may have a shape of a cylinder.

Figure 15:
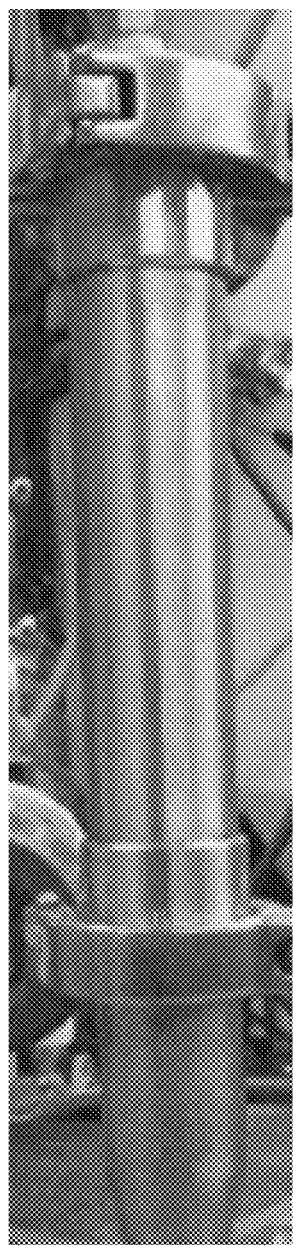
FIG. 15 illustrates a housing used to contain filter media for measuring fiber migration.

FIG. 14 is a table 1400 describing fiber migration measurements of one embodiment of a filter medium 1401 as described herein compared to fiber migration measurements of commercially available filter media. Each of the filter medium 1401 is configured to include a nonwoven sliver formed into a cylindrical shape and composed of first synthetic staple fibers having a first denier of about six (6) denier, second synthetic staple fibers having a second denier of about seventeen (17) denier, and third synthetic staple fibers having a third denier of about forty-five (45) denier. The fiber migration measurements were made per the SAE J905 (2009) modified test standard. The modifications to the SAE J905 (2009) test standard included using water as the test fluid, performing a microscope analysis for fibers only, and using single media test per analysis disk. The test conditions during the fiber migration measurements included applying a flow rate of fifteen gallons per minute per square foot (15 gpm/ft$^2$ or 633 cc/min) to the filter media for a total flush volume of eighteen thousand nine-hundred and ninety milliliters (18,990 ml). The flush time was thirty (30) minutes. Further, six (6) filter media 1401 (i.e., filter balls) as described herein were positioned in series (i.e., one above another) in a conical bottom of a housing 1500 having 1.43" inner diameter (ID), as illustrated in FIG. 15. Also, a filter analysis disc was mounted at the housing exit. The instrument used to count the number of fibers that migrated through the filter media was an Olympus BX-40 Episcopic Microscope having 10× ocular magnification, 10× objective magnification and 100× total magnification. Only fibers with dimensions of at least 100 µm×10 µm were counted.

In FIG. 14, the six (6) filter media 1401 as described herein were measured to have a fiber migration of seventy-one (71) fibers. A volume of six (6) filter media 1401 is about 0.053 cubic feet. The commercially-available filter media tested were the FIBALON® Pool media 1403 and the POLYBALLS media 1405. The six (6) FIBALON® Pool media 1403 was measured to have a fiber migration of one thousand, three hundred and eight-two (1,382) fibers. The volume of the six (6) filter media 1401 was about equivalent to a volume of the six (6) FIBALON® Pool media 1403. The six (6) POLYBALLS media 1405 was measured to have a fiber migration of one thousand, four hundred and twenty-two (1,422) fibers. The volume of the six (6) filter media 1401 was about equivalent to a volume of the six (6) POLYBALLS media 1405. Hence, the filter media 1401 has substantially less fiber migration for about an equivalent volume than the commercially-available filter media.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive "or." Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the previous description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

It is important to recognize that it is impractical to describe every conceivable combination of components or methodologies for purposes of describing the claimed subject matter. However, a person having ordinary skill in the art may recognize that many further combinations and permutations of the subject innovations are possible. Accordingly, the claimed subject matter is intended to cover all such alterations, modifications and variations that are within the spirit and scope of the claimed subject matter.

What is claimed is:

1. A filter for filtering particulate materials from a liquid, the filter comprising:
    a first non-woven sliver comprising a first set of synthetic staple fibers having different fiber lengths and a first density; and
    a second non-woven sliver comprising a second set of synthetic staple fibers having different lengths and a second density;
    wherein the first non-woven sliver and second non-woven sliver are combined to form a filter medium having a substantially cylindrical or spherical shape, and including a core having a density of at least the first density, and an outer wrap having a density of at least the second density with the filter medium having a density gradient varying from the first density to the second density; and
    wherein the filter medium is configured to filter particulate materials from the liquid with a fiber migration of approximately 500 fibers or less for a flush volume of about 18,990 milliliters at a flow rate of about 633 cubic centimeters per minute.

2. The filter of claim 1, wherein the filter medium is capable of fiber migration of no more than about 100 fibers for a flush volume of about 18,990 milliliters at a flow rate of about 633 cubic centimeters per minute applied to the filter medium having a volume of about 0.053 cubic feet.

3. The filter of claim 1, wherein at least one of the first non-woven sliver or the second non-woven sliver comprises:
    first synthetic staple fibers having a first denier;
    second synthetic staple fibers having a second denier; and
    third synthetic staple fibers having a third denier.

4. The filter of claim 3, wherein the first denier ranges from about 1 denier to about 10 denier, the second denier ranges from about 10 denier to about 20 denier, and the third denier ranges from about 20 denier to about 50 denier.

5. The filter of claim 3, wherein the second denier ranges from about 10 denier to about 20 denier, the first denier is less than the second denier, and the third denier is greater than the second denier.

6. The filter of claim 3, wherein the at least one of the first non-woven sliver or the second non-woven sliver comprises: about 10% to about 60% of the first synthetic staple fibers, about 10% to about 60% of the second synthetic staple fibers, and about 10% to about 50% of the third synthetic staple fibers.

7. The filter of claim 3, wherein at least two of the first fibers, the second fibers, or the third fibers are collectively crimped and folded to have a cross-locking characteristic.

8. The filter of claim 1, wherein the density of the core of the filter medium is greater than the density of the outer wrap of the filter medium.

9. The filter of claim 1, wherein the first set of synthetic staple fibers have a first denier ranging from about 1 denierto about 10 denier, and the second set of synthetic staple fibers have a second denier ranging from about 10 denier to about 20 denier.

10. The filter of claim 1, wherein the first set of synthetic staple fibers have a first denier and the second set of synthetic staple fibers have a second denier ranging from about 10 denier to about 20 denier, and the filter further comprises a third set of synthetic staple fibers having a third denier, wherein the second denier ranges from about 10 denier to about 20 denier, the first denier is less than the second denier, and the third denier is greater than the second denier.

11. The filter of claim 1, further comprising a third set of synthetic staple fibers having a third denier ranging from about 20 denier to about 50 denier.

12. The filter of claim 1, wherein at least one of the first non-woven sliver or the second non-woven sliver includes about 10% to about 60% of the first set of synthetic staple fibers and about 10% to about 60% of the second set of synthetic staple fibers.

13. The filter of claim 1, further comprising a third set of synthetic fibers, wherein at least one of the first non-woven sliver or the second non-woven sliver includes about 10% to about 60% of the first set of synthetic staple fibers, about 10% to about 60% of the second set of synthetic staple fibers, and about 10% to about 50% of the third set of synthetic staple fibers.

14. The filter of claim 1, wherein at least one of the first set of synthetic staple fibers or the second set of synthetic staple fibers comprises at least one of bi-component fibers or fibers configured for thermal bonding.

15. The filter of claim 1, further comprising a third set of synthetic staple fibers, wherein a percentage of a volume of the first set of synthetic staple fibers, the second set of synthetic staple fibers, and the third set of synthetic staple fibers in a volume of the filter medium is less than about 2%.

16. The filter of claim 1, wherein the filter is configured to filter particulate matter having a grain size ranging from about 5 microns to about 10 microns.

17. The filter of claim 1, wherein at least one of the first set of synthetic staple fibers or the second set of synthetic staple fibers comprises fibers that are at least one of oleophilic, oleophobic, hydrophilic, or hydrophobic.

18. The filter of claim 1, wherein fibers of the first set of synthetic staple fibers and fibers of the second set of synthetic staple fibers are collectively crimped and folded to have a cross-locking characteristic.

19. The filter of claim 1, further comprising a third set of synthetic staple fibers, wherein at least two of: fibers of the first set of synthetic staple fibers, fibers of the second set of synthetic staple fibers, or fibers of the third set of synthetic staple fibers are collectively crimped and folded to have a cross-locking characteristic.

20. The filter of claim 1, further comprising a housing comprising an inlet port and an outlet port, wherein the filter medium is configured to receive liquid via the inlet port, filter particulate materials from the liquid, and output filtered liquid to the outlet port.

* * * * *